United States Patent [19]

Pellini

[11] Patent Number: 4,685,633
[45] Date of Patent: Aug. 11, 1987

[54] UNWINDING MODULE FOR PACKING REELS CONTAINING ELECTRIC CONDUCTORS

[75] Inventor: Renzo Pellini, Sorocaba, Brazil

[73] Assignee: Pirelli S/A Companhia Industrial Brasileira, Brazil

[21] Appl. No.: 815,581

[22] Filed: Jan. 2, 1986

[30] Foreign Application Priority Data

Jan. 4, 1985 [BR] Brazil .................................. 8500013

[51] Int. Cl.$^4$ ...................... B65H 49/04; B65D 85/66
[52] U.S. Cl. .................................... 242/85; 242/129.6; 242/77.2; 206/389; 206/509; 206/513
[58] Field of Search ...................... 242/77, 77.2, 77.3, 242/54 R, 85, 86.5 R, 128, 129, 129.6, 129.62, 96, 130, 134, 137, 141; 206/395, 397, 389, 408, 513, 459, 509; 191/12.2 R, 12.2 A, 12.4

[56] References Cited

U.S. PATENT DOCUMENTS

| | | | |
|---|---|---|---|
| 2,795,385 | 6/1957 | Becker | 242/77.2 X |
| 2,841,343 | 7/1958 | Dorman | 242/129.6 |
| 2,974,818 | 3/1961 | Rehrig | 206/509 |
| 3,279,720 | 10/1966 | Garrett | 242/129.6 |
| 4,010,914 | 3/1977 | Kowalski | 242/129.62 |
| 4,079,077 | 3/1978 | David | 206/513 X |
| 4,385,738 | 5/1983 | McDonald | 242/137 X |
| 4,548,368 | 10/1985 | Tomlinson | 242/129.6 |
| 4,591,109 | 5/1986 | Kremer | 242/129 |

Primary Examiner—Stuart S. Levy
Assistant Examiner—David Werner
Attorney, Agent, or Firm—Brooks Haidt Haffner & Delahunty

[57] ABSTRACT

A module for receiving a reel having an electric conductor wound thereon and permitting the conductor to be unwound from the reel. The module is a six-sided frame made of wire and having at least one open side for inserting the reel within, and removing the reel from, the frame. At opposed sides adjoining the open side, there are guides secured to the frame for receiving the ends of a shaft with a cage of wires thereon insertable into the bore of the reel, the shaft and cage being rotatable on the guides to permit the reel to rotate when the electric conductor is withdrawn therefrom. Corners of the frame are provided with wire loops which will interfit with wire loops on adjacent frames to maintain the frames in desired relative positions. The frame may have a carrying handle, plates for securing the frame to a structure and panels for receiving advertising or instructional material.

14 Claims, 8 Drawing Figures

UNWINDING MODULE FOR PACKING REELS CONTAINING ELECTRIC CONDUCTORS

This invention relates to an unwinding module for packing reels containing electric conductors.

As is widely known, electric conductors in general, and other similar products, which are usually wound around themselves, forming conventional rolls, or around cores or support reels, present a certain difficulty relating to their handling in the resale and installation market, and this not only as a result of the traditional manner of packing as described, but also, of the manner in which such units are arranged at the relevant storage and/or sale establishments.

In fact, a traditional arrangement which frequently occurs is that such rolls or reels are simply stacked one upon the other without any order or logic, causing difficulty in locating the desired unit, and then, after it is separated from the group, one has to unwind it on the floor, counter or equivalent, often with small dimensions, to pull out and cut the electric conductor in the desired length.

Under these circumstances, one observes, in said electric conductor resale and installation market, some attempts to organize, or at least to make the handling of such wire rolls easier, such as, for instance, by the use of long fixed horizontal cross bars kept at a high level, e.g. cylindrical wood supports (of the broomstick type), around which such reels are placed side-by-side and pulled therefrom for measuring and cutting.

Another measure resorted to by such establishment is the making and installation of wood or iron trestles or shelves, also with inner cross bar or equivalent supports, for receiving the electric conductor rolls or reels which are there equally and more rationally positioned, ready to be pulled out, measured and cut.

Added to that is also the use of special wire measuring machines, coupled to a cone-shaped piece for supporting the roll, from which the wire is pulled out by the shop clerk for measuring and cutting.

Despite the value of such attempts, there are restrictions and criticisms which may be made, however, either of an economic nature, affecting mainly said measuring machines and even the aforesaid wooden or metal frameworks, or a mechanical nature, such as, for instance the encumbering horizontal cross bars with multiple reels, or even of another nature.

Thus, it is in view of the above that the unwinding module for packing reels containing electric conductors was designed, such module being extremely simple but quite ingenious in its constructive conception, practical in its handling, versatile in its use and extremely efficient for the job which it is meant for, to which is added a feature of extremely reduced cost, which even allows it to be discardable.

The attached drawings illustrate this invention, wherein.

Figure 4:
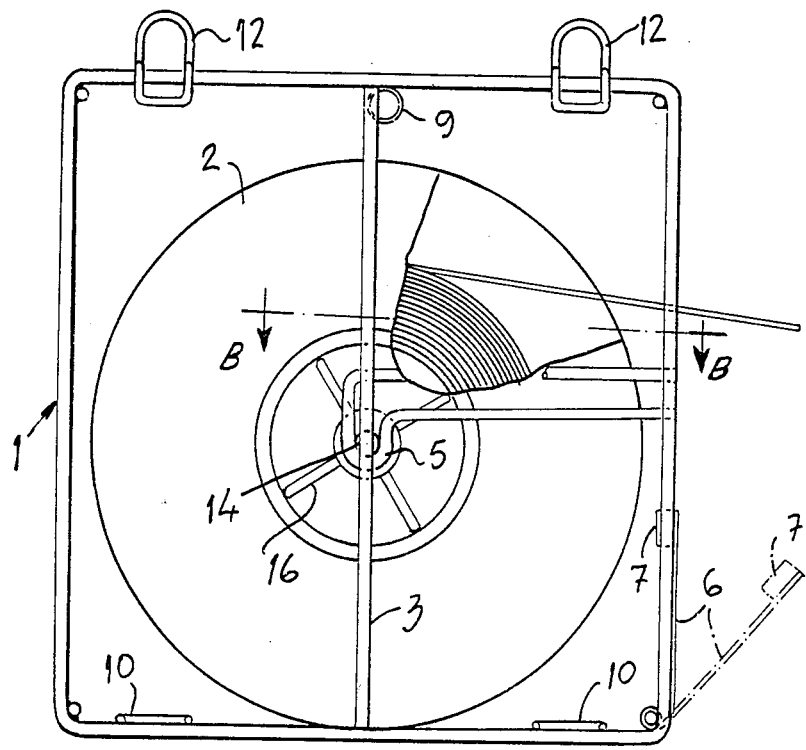
FIG. 4 is a side view, partially in section, of said unwinding module, illustrating the electric conductor as it is being pulled out.
Figure 5:
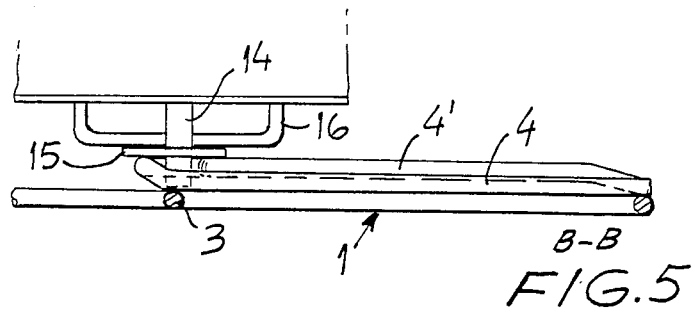
FIG. 5 is a fragmentary view taken along the line B—B indicated in FIG. 4.

As illustrated by the drawings, the unwinding module for packing reels containing electrical conductors comprises a substantially parallelopipedal, cage-like frame 1 (FIG. 1) made of galvanized steel wire with a round, rectangular or any other cross-section, such frame having two opposite, or at least one, entirely open side face to allow the free insertion and removal of the electric conductor packing reel 2. Other sides may be provided with inner structural reinforcement cross bars 3, and said frame is further provided, at the pair of side faces immediately adjoining the reel 2 inlet and/or outlet, with double part horizontal guides 4,4' similarly made of galvanized steel wire arranged at the middle starting from the vertical side edge of the face and going up to the middle of the face, where they are formed into a U-shaped lower enlargement 5 (FIGS. 1 and 4), such guides having the lower branch 4' of their straight portions and the U-shaped end enlargement 5 in a plane displaced inwardly in relation to the straight portion of the higher branch 4 (FIG. 5).

Figure 2:
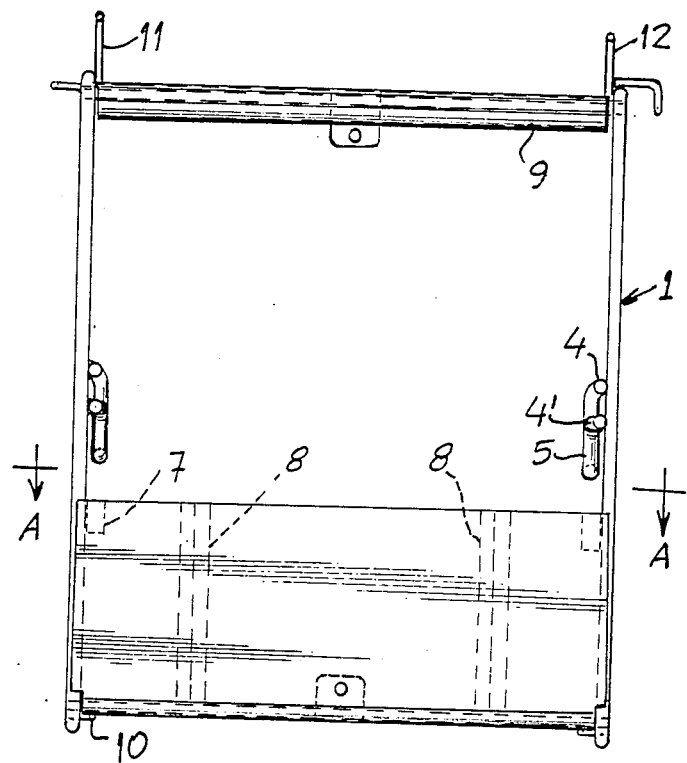
FIG. 2 is a front view of the unwinding module shown in FIG. 1.
Figure 3:
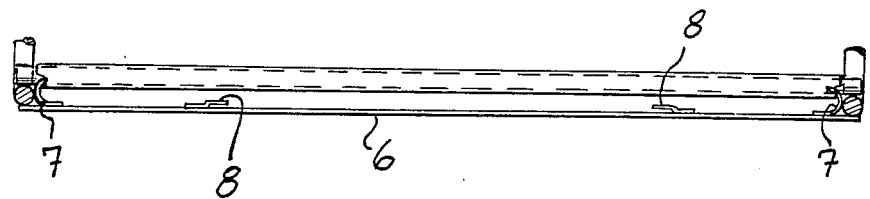
FIG. 3 is a cross-sectional view taken along the line A—A indicated in FIG. 2.

The cage-like framework 1 thus formed also has a series of accessory and/or complementary elements, such as a galvanized front sheet 6 for applying advertising and/or commercial messages, attached in a pivotable manner (FIG. 4), that is, articulated by an end fold around the lower (or upper) end cross bar of the reel inlet and/or outlet side face, said metal sheet 6 having any desired height and being fitted, at the inner upper (or lower) corners, with a pair of bent lock pawls 7 to be pressed against the vertical sides of said face (FIG. 3). The sheet 6 may also have, at its inner face, vertical guides 8 (FIG. 2) for receiving tablets, panels or other equivalent items containing references to the packed product.

Another accessory element of such unwinding module is a handle, formed for instance by a metal or plastic tube applied around an inner cross bar of the upper face (FIG. 1), for ease of carrying the module.

Further, the cage-like framework 1 is fitted with male/female type coupling devices for coupling multiple units one on the top of the other or side-by-side (FIG. 7), in the form of pairs of small U-shaped inner loops 10 (FIG. 1) provided at the sides of the base face and corresponding in dimensions and positioning to pairs of L-shaped rectangular loops 11 and to other, also rectangular but larger, Z-shaped loops 12 fitted on the upper face sides of the frame.

A last accessory of such frame, designed to enable its fastening, in stable suspension, to any kind of surface, such as, a wall, counter, shelf or similar structure is made up of small metal plates 13 with center holes and fastened at the four corners of the opposite side faces to the inlet of the reel 2.

Figure 1:
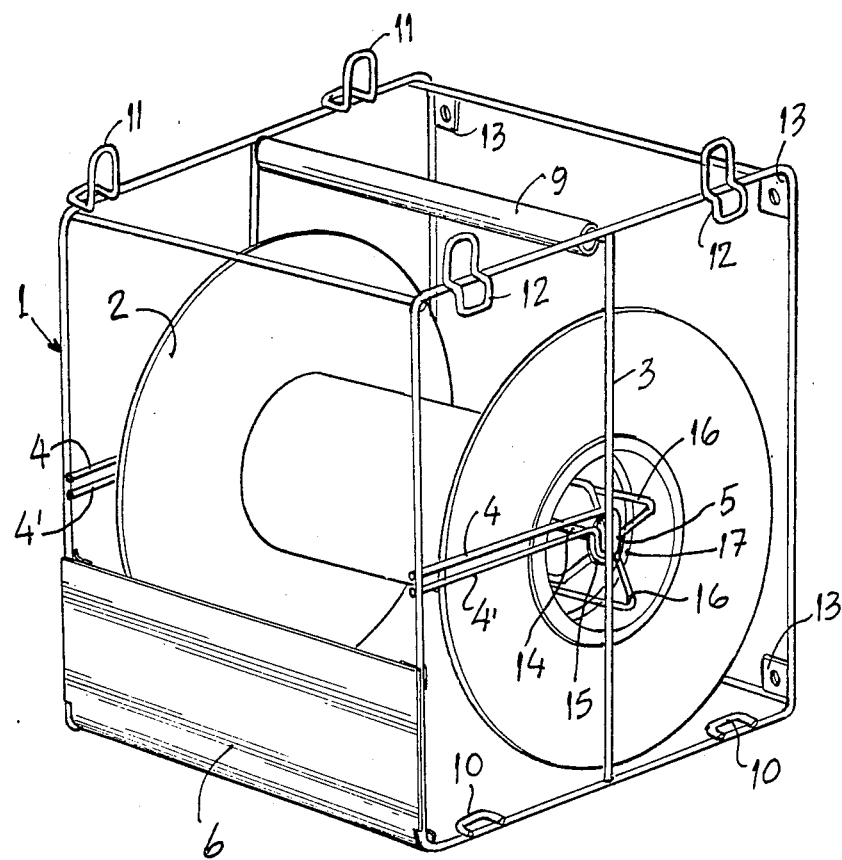
FIG. 1 shows, in perspective, an unwinding module for a single packing reel containing electric conductors.

Finally, as a component of such module, and not part of the electric conductor packing reel 2, there is a shaft therefor, made up of a galvanized steel wire straight piece 14, with a round, rectangular or other cross-section, having a small flange 15 near each end, for stabilizing the fitting of the relevant shaft ends to the U-shaped ends of the double guide 4,4' of each module side (FIGS. 4 and 5), such shaft being completed by a frame equally made of galvanized steel wire, made up of four radial U-shaped side wings 16 encircled by an outer pair of enveloping rings 17, only one of which is visible in FIG. 1, to be received at the inside of the reel 2 center core.

Obviously, the described unwinding module may be made with variations of a construction type, for instance, the cross-section of the galvanized steel wire, whether of the structural framework 1, the double guides 4,4', or the coupling devices 10, 11 and 12, the location of the galvanized metal sheet 6 for receiving various messages, the reel 2 supporting shaft construction itself, etc.

Figure 8:
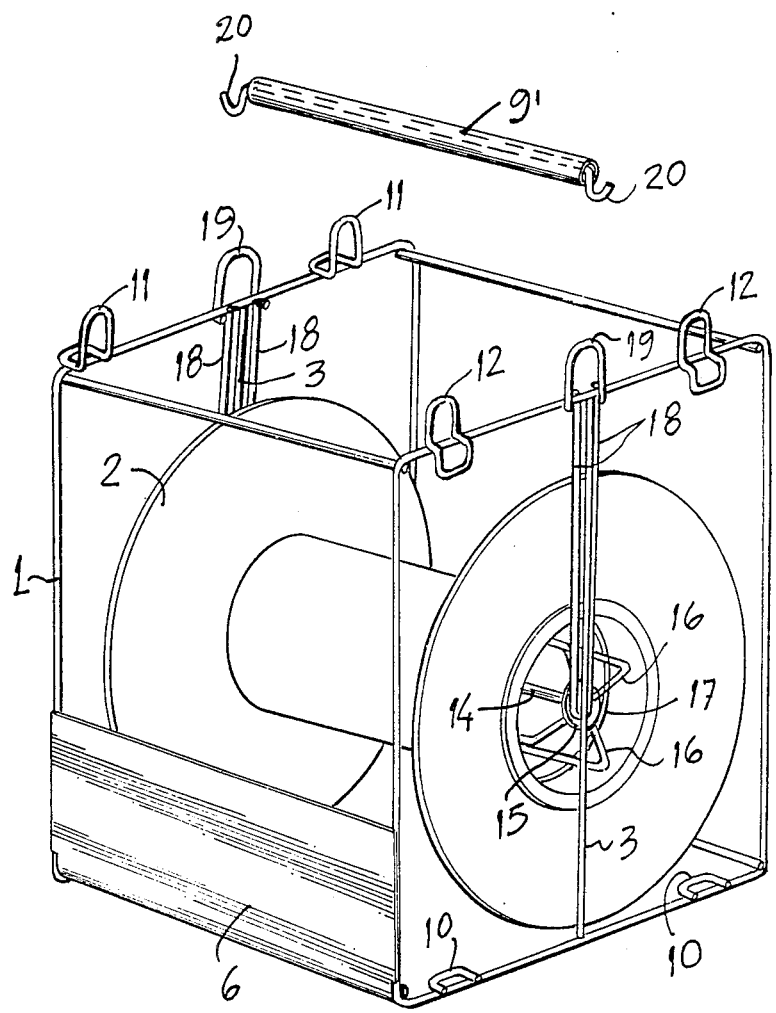
FIG. 8 is a perspective view of an alternative form of an unwinding module.

One preferred alternative construction is illustrated in FIG. 8, wherein the reel inlet double guide is made up, at two opposite sides of the unit, by a long and narrow wire guide 18, straight and vertical sides joined by a U-shaped portion. The branches of the guide 18 lie on the same plane, and extend from the median point of the face upper corner to the median point of the face, thus establishing a condition for inserting and removing the reel 2 through the module upper open face. Such alternative construction permits using, at the same side face upper corners, an opposed pair of small inverted U-shaped loops 19 for receiving the hook-like bent ends 20 of the inner core of a tubular handle applied thereto in a removable manner for carrying the module.

Figure 6:
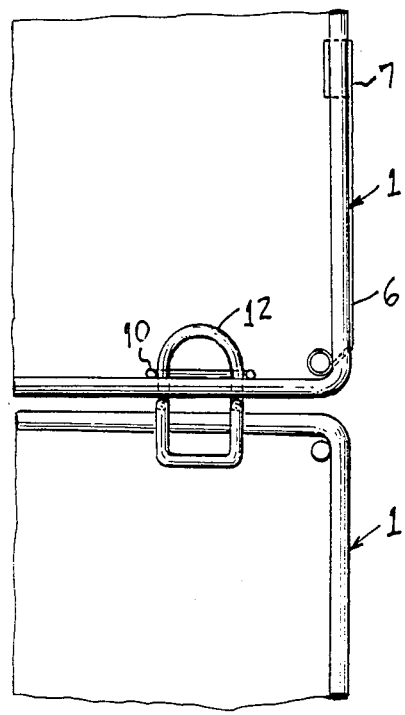
FIG. 6 is a fragmentary, enlarged view, showing the stabilization when two units are piled up one on top of the other.
Figure 7:
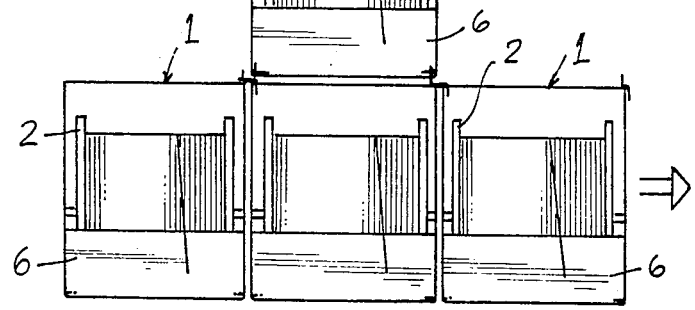
FIG. 7 illustrates schematically an assembly made up of several units of said unwinding module coupled sidewise and vertically.

FIG. 7 and the enlarged showing of FIG. 6 illustrate the coupling of multiple modules, such as the one described, at any given establishment, such as a sale outlet, an electric or construction material or other shop, building company, installation company and similar ones, said modules being arranged one on the top of the other or side by side, in stable positions, by means of the interlocking of their various male/female coupling devices 10, 11 and 12.

Obviously, in addition to the main use of such module, which is packing, displaying for sale and making easier the handling of reels containing electric conductors or similar products, another use for the same, of a promotional kind, should be pointed out. Thus, advertising and/or promotional messages, can be applied either to the sides of reel 2 itself or to the galvanized metal sheet 6 provided at the front face of module 1.

I claim:

1. A module for rotatably receiving and supporting a shaft which supports a reel having and elongate member wound thereon, said module comprising:
    a parallelopipedal frame formed by wires at its corners secured to adjacent corner wires and defining opposed and spaced front and rear faces, opposed and spaced interconnecting faces interconnecting said front and rear faces and a pair of opposed and spaced side faces, said front and rear faces and said interconnecting faces respectively being spaced apart by a distance at least equal to the diameter of said reel and said side faces being spaced apart by a distance at least equal to the axial length of said reel, said front face having an opening of a size which permits insertion and removal of said reel into and out of the interior of said frame; and
    two pairs of spaced guide wires secured to said frame for receiving said shaft, one pair of said guide wirs extending from a point at one side of said front face spaced from said top and bottom faces by a distance at least equal to the radius of said reel toward said rear face for a distance at least equal to the radius of said reel and the other pair of said guide wires extending from a point at the other side of said front face spaced from said top and bottom faces by a distance at least equal to the radius of said reel toward said rear face for a distance at least equal to the radius of said reel, each said pair of guide wires having a partial loop portion at a distance from said front face at least equal to the radius of said reel for receiving and restricting movement of said shaft in the direction from one said rear face and said front face toward the other thereof; whereby said shaft with said reel thereon may be inserted into the interior of said frame by inserting the ends of said shaft between said pairs of guide wires and moving said shaft toward said rear face until the ends thereof are received in said partial loop portion of each said pair of guide wires.

2. A module as set forth in claim 1 wherein said interconnecting faces are top and bottom faces and wherein said partial loop portion is part of the guide wire of each said pair of guide wires which is nearer to said bottom face than the other guide wire of each said pair of guide wires.

3. A module as set forth in claim 1 wherein said interconnecting faces are further side faces and said front and rear faces are, respectively, top and bottom faces and wherein said partial loop portion interconnects the guide wires of each said pair of guide wires.

4. A module as set forth in claim 1 further comprising a pair of reinforcing wires, one at one of said pair of side faces and the other at the other of said side faces, each of said pair of reinforcing wires being connected at one end to a wire at one corner of the side face with which it is associated and at the other end to a wire at the opposite corner of the side face with which it is associated.

5. A module as set forth in claim 4 wherein said pair of guide wires are connected, respectively, to a respective one of said pair of reinforcing wires.

6. A module as set forth in claim 1 including said shaft, said shaft comprising a central member having a plurality of U-shaped members secured thereto and spaced circumferentially thereof, said members being secured to said shaft at the ends of the legs thereof with one end of each loop adjacent one end of said central member and with the other end of each loop at the other end of said central member.

7. A module as set forth in claim 6 wherein said shaft further comprises at least one ring encircling said U-shaped members.

8. A module as set forth in claim 6 wherein said shaft further comprises a pair of flanges secured to said central member for engagement, respectively, with a said partial loop portion of said pair of guide wires, one of said pair of flanges being secured to said central member adjacent one end thereof and the other of said pair of flanges being secured to said central member adjacent the other end thereof.

9. A module as set forth in claim 1 further comprising a wire handle extending between wires at opposite corners of a face.

10. A module as set forth in claim 9 wherein the last-mentioned said face is one of said interconnecting faces and said wire handle comprises a wire secured at its ends to the wires at the corners of said one of said interconnecting faces.

11. A module as set forth in claim 9 wherein the last-mentioned said face is said front face and said wire handle has a pair of hooks, one at one end and the other at the opposite end of said wire handle and further comprising a pair of loops for receiving said hooks, one of said loops being secured to a wire at one corner of said front face and the other of said loops being secured to the wire at the opposite corner of said front face.

12. A module as set forth in claim 1 further comprising a panel extending between the corner wires of one of said faces.

13. A module as set forth in claim 1 wherein said module further comprises interconnecting means for interconnecting it with adjacent similar modules, said interconnecting means comprising:
 a pair of spaced L-shaped loops secured to a corner wire of one of said faces and extending outwardly of said frame;
 a pair o spaced Z-shaped loops secured to the opposite corner wire of said one of said faces, one leg of each Z-shaped loop extending outwardly from said frame and substantially parallel to the direction of one leg of said L-shaped loops and the other leg of each Z-shaped loop being spaced outwardly of the corner wire to which the Z-shaped loop is attached and extending perpendicularly to the direction of the other leg of the L-shaped loops;
 two pairs of spaced loops, each pair being secured, respectively, to a corner wire of the face opposite to said one of said faces, each of the loops of said two pairs of spaced loops extending inwardly of said frame; and
 one of said pairs of spaced loops being dimensioned and disposed to receive said one leg of said pair of Z-shaped loops of an adjacent module, the other of said pairs of said loops being dimensioned and disposed to receive one of the legs of said pair of L-shaped loops of an adjacent module and the other leg of said Z-shaped loops being dimensioned and disposed to receive the other leg of said L-shaped loops of an adjacent module.

14. A module as set forth in claim 1 further comprising a plurality of plates each having an aperture therein, said plates being secured in spaced relation and to the corner wires of said rear face.

* * * * *

UNITED STATES PATENT AND TRADEMARK OFFICE
CERTIFICATE OF CORRECTION

PATENT NO. : 4,685,633

DATED : August 11, 1987

INVENTOR(S) : Renzo Pellini

It is certified that error appears in the above-identified patent and that said Letters Patent is hereby corrected as shown below:

Col. 3, line 66, "wirs" should read --wires--;
Col. 5, line 21, "o" should read --of--;
Col. 6, line 14, "said" (second occurrence) should read --spaced--.

Signed and Sealed this

Twenty-ninth Day of March, 1988

Attest:

DONALD J. QUIGG

*Attesting Officer*     *Commissioner of Patents and Trademarks*